United States Patent Office 3,138,620
Patented June 23, 1964

3,138,620
ANDROSTANONE DERIVATIVES
John S. Tadanier, Chicago, Ill., assignor to Abbott Laboratories, North Chicago, Ill., a corporation of Illinois
No Drawing. Filed June 27, 1962, Ser. No. 205,543
6 Claims. (Cl. 260—397.3)

The present application is concerned with a process for converting 6β-hydroxy-3α,5α-cycloandrostan-17-one into nitro-group-containing steroids of the androst-17-one series. It particularly relates to 6β-nitro-3α,5α-cycloandrostan-17-one (I) and the nitrate ester of 3β-hydroxyandrost-5-en-17-one (II), (I)

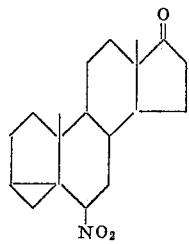

(II)

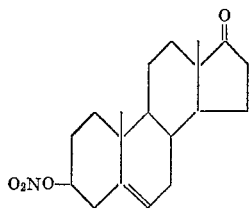

and the process of their manufacture.

The new compounds to which the resent invention is directed are useful new hormones with endocrine activity. The nitrate ester of 3β-hydroxyandrost-5-en-17-one is a stable ester of a natural androgen and as such is useful as an antiandrogen. 6β-nitro-3α,5α-cycloandrostan-17-one is also useful as an antiandrogen.

Both new compounds result from the treatment of 6β-hydroxy-3α,5α-cycloandrostan-17-one (described by Butenandt et al. in Berichte, volume 75, page 591, of 1942) with sodium nitrite in the presence of acetic acid and water. From the foregoing it will be clear that, since one and the same process produces two different materials using the same starting material and the same reactants, the differentiation between the reactions lies in process conditions. Both reactions are carried out at room temperature and required several hours of interaction between the steroid used as starting material and the nitrosating medium. However, if this reaction is carried out in the presence of aqueous acetic acid of at least about 60% concentration, the nitrate ester of 3β-hydroxyandrost-5-en-17-one is obtained, while when acetic acid of less than about 60% concentration is used, 6β-nitro-3α,5α-cycloandrostan-17-one is obtained from the reaction mixture.

To better illustrate the foregoing general embodiments, the following examples are given below. These examples are not meant to limit the invention in any respect since various modifications of the conditions in these examples will be apparent to those skilled in the art.

EXAMPLE 1

*3β-Hydroxyandrost-5-En-17-One Nitrate Ester*

A freshly prepared solution of 2.12 grams of sodium nitrite in 13.4 ml. of water is added to a solution of 610 mg. of 6β-hydroxy-3α,5α-cycloandrostan-17-one in 40 ml. of glacial acetic acid. The reaction mixture is swirled to effect homogeneity and allowed to stand at room temperature for 19 hours. The resulting solution is shaken with a mixture of 200 ml. of ether and 400 ml. of water. The aqueous solution is separated and extracted with 200 ml. of ether. The ether solutions are washed, in series, with three 100-ml. portions of water, two 150-ml. portions of a 5% aqueous sodium bicarbonate solution, and three 100-ml. portions of water. The ether solutions are then combined and dried over anhydrous magnesium sulfate. After evaporating the ether, 673 mg. of a pale-yellow glass remains in the flask.

Of this product, 660 mg. is heated under reflux for one hour with 20 ml. of a 5% methanolic potassium hydroxide solution. The reaction solution is worked up by ether extraction in the usual manner to yield 590 mg. of a mixture of solid and oil. This material is dissolved in 10 ml. of ether and placed on an 80-gram column of neutral alumina of activity 111. The column is eluted with ether/pentane (1:10), yielding 203 mg. of the nitrate ester of 3β-hydroxyandrost-5-en-17-one, melting at 127–130° C. Infrared absorption maxima of this compound are observed at 1730 cm.$^{-1}$, 1623 cm.$^{-1}$, doublet at 1282 and 1271 cm.$^{-1}$, and at 864 cm.$^{-1}$. Recrystallization of this material from ether/pentane yields 157 mg. of the pure material, melting at 142–143.5° C. This material has a $[\alpha]_D^{26}$ of $+1.92°$ as a 1% solution in chloroform and its analytical values of 68.64% C, 8.28% H, and 4.08% N closely match those calculated for the empirical formula $C_{19}H_{27}NO_4$.

EXAMPLE 2

*6β-Nitro-3α,5α-Cycloandrostan-17-One*

A freshly prepared solution of 6 grams of sodium nitrite in 150 ml. of water is added to 1.52 grams of 6β-hydroxy-3α,5α-cycloandrostan-17-one in 150 ml. of glacial acetic acid. The resulting solution is swirled to effect homogeneity and allowed to stand at room temperature for 26 hours. The resulting solution is shaken with a mixture of 700 ml. of ether and 700 ml. of water. The aqueous phase is separated and extracted with 700 ml. of ether. The ether solutions are washed in series with two 200-ml. portions of water, three 250-ml. portions of a 5% aqueous sodium bicarbonate solution, and three 200-ml. portions of water. The ether solutions are then combined and dried over anhydrous magnesium sulfate. After evaporating the solvent, 1.64 grams of an orange glass remains in the container.

This residue is dissolved in 50 ml. of pure pyridine (reagent grade) and 10 ml. of acetic anhydride is added thereto. The solution is allowed to stand at room temperature for 20 hours and is then shaken with a mixture of 500 ml. of ether and 600 ml. of water. The aqueous phase is separated and extracted with 500 ml. of ether and the ether solutions are washed in series with four 300-ml. portions of water, whereupon the ether solutions are combined and dried over anhydrous magnesium sulfate. The ether is evaporated and the residual pyridine is removed under aspirator pressure on a steam bath using a rotary evaporator, leaving 1.79 grams of an orange oil. This product is chromatographed on 160 grams of neutral alumina of activity 111. After eluting the column with 900 ml. of ether/pentane (1:5) to remove 3β-acetoxyandrost-5-en-17-one and other intermediate fractions, further elution with 600 ml. of ether/pentane (1:5) yields 338 mg. of 6β-nitro-3α,5α-cycloandrostan-17-one as a white solid melting at 173–180° C. For analysis this material is recrystallized from benzene/Skellysolve B using carbon. The analytical sample melts at 178–180° and analyzes 71.94% C, 8.43% H, and 4.22% N, corresponding closely to the calculated values for the desired compound of empirical formula $C_{19}H_{27}NO_3$.

Alternately, 6β-nitro-3α,5α-cycloandrostan-17-one can be isolated from the reaction mixture directly by chromatography without treatment of the crude with acetic anhydride and pyridine.

It will be apparent to those skilled in the art that a variety of different separation methods can be used in the above procedures to eliminate possible by-products. Such procedural changes are within the spirit of the present invention which is directed only to the process of treating 6β-hydroxy-3α,5α-cycloandrostan-17-one with sodium nitrite in the presence of acetic acid. In place of sodium nitrite, other alkali nitrites may be used, e.g. potassium nitrite. The amount of alkali metal nitrite used in the present process is not critical as long as at least an excess thereof is employed.

As seen from the above examples, the reaction of the present invention is permitted to continue for a considerable period of time at room temperature. In order to obtain good yields of the desired materials, this reaction should be permitted to continue for at least 10 hours, preferably between 15 and 30 hours. As shown above, the reaction takes place at room temperature, but, if desired, slightly higher or slightly lower temperatures can be used, e.g. temperatures between 15° and 30° C. are satisfactory.

The two new steroids made by the process of the present invention are thus obtained under similar conditions: when the nitrate ester of 3β-hydroxyandrost-5-en-17-one is the desired end product, the treatment with sodium nitrite is preferably carried out in an aqueous acetic acid solution wherein the concentration of said acetic acid is at least 60%; when 6β-nitro-3α,5α-cycloandrostan-17-one is the desired end product, the treatment with sodium nitrite is preferably carried out in aqueous acetic acid of a concentration below 60%.

Others may practice the invention in any of the numerous ways which will be apparent to one skilled in the art by the present disclosure. All such practice of the invention shall be considered a part hereof provided it falls within the scope of the appended claims.

I claim:
1. The process of treating 6β-hydroxy-3α,5α-cycloandrostan-17-one with at least an equimolar amount of an alkali metal nitrite in the presence of aqueous acetic acid for a period of at least 10 hours.
2. The process of claim 1 wherein said alkali metal nitrite is sodium nitrite.
3. The process of claim 1 wherein said aqueous acetic acid is of a concentration of at least 60%.
4. The process of claim 1 wherein said aqueous acetic acid is of a concentration of less than 60%.
5. 6β-nitro-3α,5α-cycloandrostan-17-one.
6. The nitrate ester of 3β-hydroxyandrost-5-en-17-one.

No references cited.